(12) United States Patent
Kobyakov et al.

US010025036B2

(10) Patent No.: US 10,025,036 B2
(45) Date of Patent: Jul. 17, 2018

(54) OPTICAL CONNECTORS AND OPTICAL COUPLINGS FOR FIBER-TO-PHOTONICS CIRCUIT CONNECTIONS

(71) Applicant: Corning Optical Communications LLC

(72) Inventors: Andrey Kobyakov, Hickory, NC (US); Esteban Belisario Marin, Hickory, NC (US)

(73) Assignee: Corning Optical Communications LLC, Hickory, NC (US)

(*) Notice: Subject to any disclaimer, the term of this patent is extended or adjusted under 35 U.S.C. 154(b) by 0 days.

(21) Appl. No.: 15/162,878

(22) Filed: May 24, 2016

(65) Prior Publication Data
US 2017/0343738 A1 Nov. 30, 2017

Related U.S. Application Data

(60) Provisional application No. 62/168,442, filed on May 29, 2015.

(51) Int. Cl.
*G02B 6/30* (2006.01)
*G02B 6/38* (2006.01)
*G02B 6/42* (2006.01)

(52) U.S. Cl.
CPC .......... *G02B 6/30* (2013.01); *G02B 6/3834* (2013.01); *G02B 6/3847* (2013.01); *G02B 6/3882* (2013.01); *G02B 6/3885* (2013.01); *G02B 6/4292* (2013.01)

(58) Field of Classification Search
None
See application file for complete search history.

(56) References Cited

U.S. PATENT DOCUMENTS

| | | | |
|---|---|---|---|
| 6,957,920 B2 * | 10/2005 | Luther | G02B 6/38 385/75 |
| 2007/0098328 A1 * | 5/2007 | Dean, Jr. | G02B 6/3839 385/71 |
| 2015/0010268 A1 | 1/2015 | Badihi et al. | |
| 2015/0063747 A1 | 3/2015 | Chen et al. | |

(Continued)

OTHER PUBLICATIONS

C. Gunn and T. L. Koch, "Silicon Photonics," Optical Fiber Telecommunications VA, Chapter 11, pp. 381-429, Elsevier 2008.

(Continued)

*Primary Examiner* — Omar R Rojas
(74) *Attorney, Agent, or Firm* — Robert L. Branham

(57) ABSTRACT

Optical connectors and optical couplings for fiber-to-chip optical connections are disclosed. In one embodiment, an optical connector includes a ferrule body having a surface, an optical interface disposed within the surface. The optical interface is recessed with respect to the surface by an offset distance, and at least one fiber bore through the ferrule body and terminating at the optical interface. The optical connector further includes at least one optical fiber disposed within the at least one fiber bore such that the optical fiber protrudes beyond a surface of the optical interface. In another embodiment, a compliant material is disposed on a ferrule surface of a ferrule body such that one or more optical fibers pass through the compliant material and protrude beyond a surface of the compliant material. A clamp may also be provided to clamp the optical connector to a substrate.

25 Claims, 11 Drawing Sheets

(56) References Cited

U.S. PATENT DOCUMENTS

2015/0063769 A1    3/2015  Doerr et al.
2015/0168646 A1*  6/2015  Arai .................. G02B 6/122
                                                            385/14

OTHER PUBLICATIONS

Helios, "Silicon Photonics course," http://www.helios-project.eu/Download/Silicon-photonics-course/.

T. Barwicz and Y. Taira, "Low-Cost Interfacing of Fibers to Nanophotonic Waveguides: Design for Fabrication and Assembly Tolerances," IEEE Photonics Journal, vol. 6, No. 4, Paper 6600818, Aug. 2014.

K. Schmidtke et al., "960 Gb/s Optical Backplane Ecosystem Using Embedded Polymer Waveguides and Demonstration in a 12G SAS Storage Array," Journal of Lightwave Technology, vol. 31, No. 24, Dec. 15, 2013, pp. 3970-3975.

D.-W. Kim, J.-Y. Lee, J.-H. Kim, and G. Kim, "Pluggable Compact Optical Connector for Si-Photonics Chip Using MT-Ferrule," Proc. SPIE 7943, Silicon Photonics VI, 79430P (Jan. 17, 2011); doi:10.1117/12.874528.

\* cited by examiner

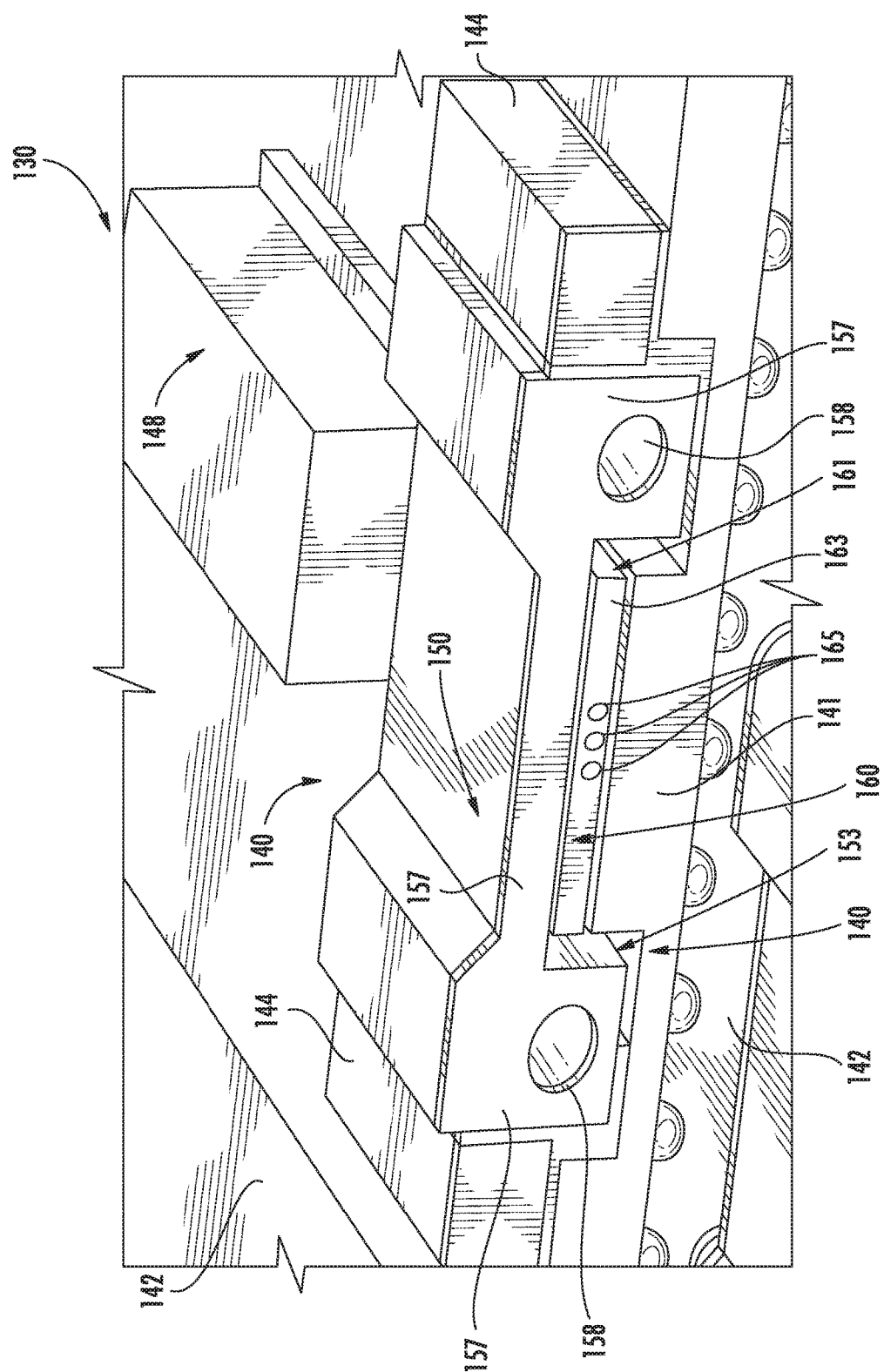

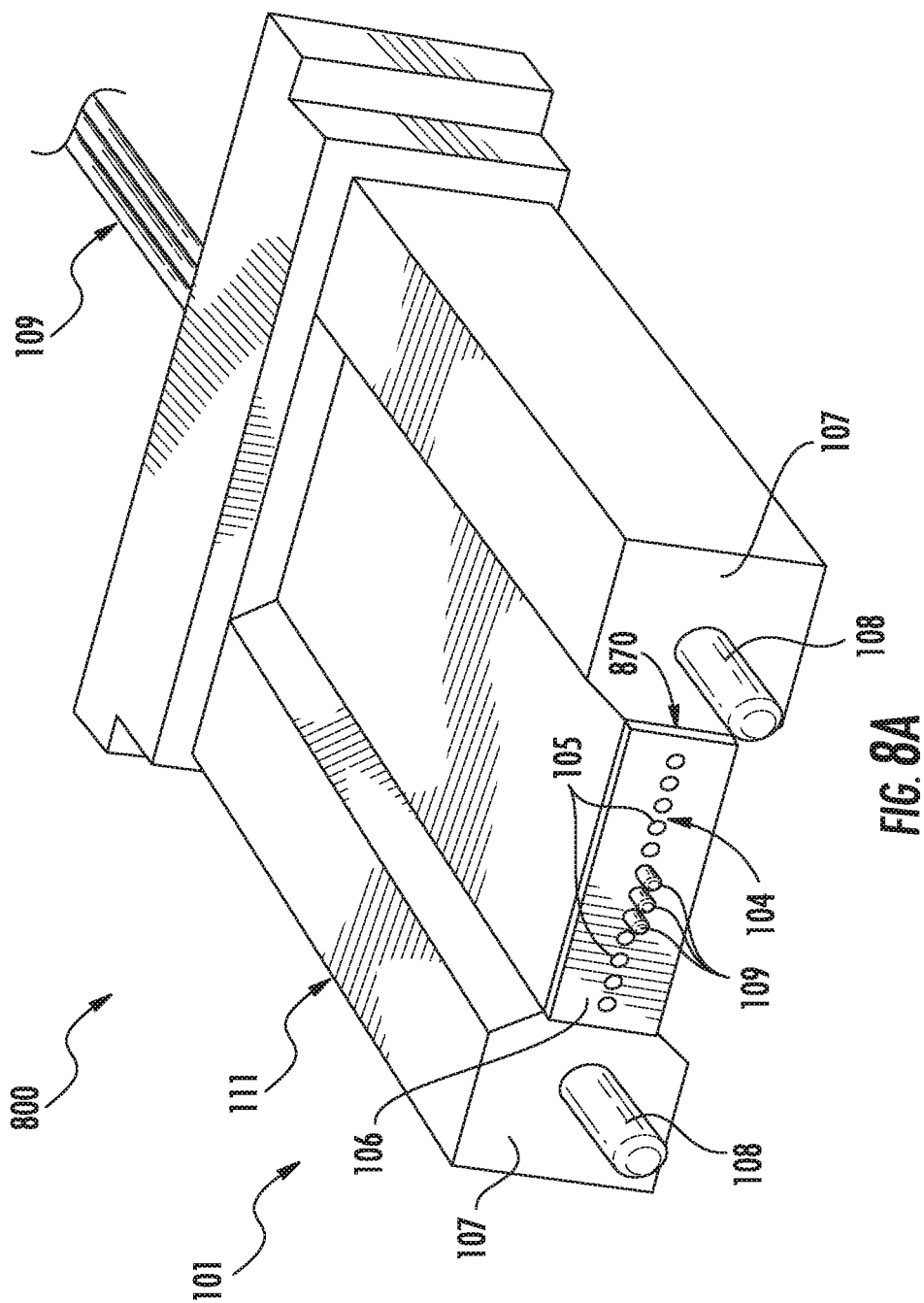

US 10,025,036 B2

OPTICAL CONNECTORS AND OPTICAL COUPLINGS FOR FIBER-TO-PHOTONICS CIRCUIT CONNECTIONS

CROSS-REFERENCE TO RELATED APPLICATIONS

This application claims the benefit of priority to U.S. Provisional Application No. 62/168,442, filed on May 29, 2015, and is incorporated herein by reference.

BACKGROUND

The present disclosure generally relates to high-bandwidth optical communication and, more particularly, to optical connectors and optical couplings for fiber-to-chip optical connections.

Benefits of optical fiber include extremely wide bandwidth and low noise operation. Because of these advantages, optical fiber is increasingly being used for a variety of applications, including, but not limited to, broadband voice, video, and data transmission. Connectors are often used in data center and telecommunication systems to provide service connections to rack-mounted equipment and to provide inter-rack connections. Accordingly, optical connectors are employed in both optical cable assemblies and electronic devices to provide an optical-to-optical connection wherein optical signals are passed between an optical cable assembly and an electronic device.

As the bandwidth of optical transceiver devices increases (e.g., up to 100 Gbps per channel) by advanced techniques such as silicon-based laser systems and wavelength division multiplexing, large amounts of data must be electronically transferred from the active devices and associated electronics to electronic components of the computing device (e.g., a data switching device of a data center) for further processing. Further, the size of optical transceiver devices (e.g., laser diodes, photodiodes) continues to decrease, which presents challenges in maintaining proper alignment between a chip-based transceiver device and the optical connector to which it is connected. Accordingly, alternative optical communication systems are desired.

SUMMARY

Embodiments are directed to optical connectors and optical couplings for silicon photonics-based, high-bandwidth optical communication that transfers large amounts of data at high speeds between computing devices. More specifically, embodiments are directed to connectors for fiber-to-chip optical coupling between the optical fiber(s) of an optical connector and the waveguide(s) of a transceiver chip, such as a silicon photonics circuit chip. Silicon photonics allows an increase in the bit rate of short reach interconnections (e.g., chip-to-chip or backplane-to-backplane interconnections), while keeping system costs relatively low. The increase in the bit rate is achieved by using optical fiber as a transmission medium. The low cost is maintained by employing the existing mature manufacturing technology for silicon.

Fiber-to-chip optical coupling should provide for low loss coupling between the optical fiber and the waveguide fabricated on or in the photonics circuit component (e.g., a photonics circuit chip). Generally speaking, the end of the optical fiber should be positioned within about 1 μm of the waveguide end face of the photonics circuit component to minimize coupling loss. During normal operation, the photonics circuit component operates at an increased temperature such as, without limitation, about 80° C. Due to the differences of the coefficient of thermal expansion (CTE) of the different materials of the components involved in the fiber-to-chip connection, the interface at the photonics circuit component may become distorted. Therefore, high mating forces may be needed to maintain a physical connection between the optical fibers and the substrate of the photonics circuit component. Embodiments of the present disclosure provide for an optical connector comprising a ferrule body and optical fiber arrangement that mitigates the distortion effect on the mated components, and, in some embodiments, minimizes fiber-to-waveguide misalignment due to CTE mismatch over the operating temperature of the photonics circuit component. In some embodiments, a clamp is also utilized to maintain a physical connection between the optical fiber(s) of the optical connector and the waveguide(s) of the photonics circuit chip.

In this regard, in one embodiment, an optical connector includes a ferrule body having a surface, an optical interface disposed within the surface such that the optical interface is recessed with respect to the surface by an offset distance d, and at least one fiber bore through the ferrule body and terminating at the optical interface. The optical connector further includes at least one optical fiber disposed within the at least one fiber bore such that the at least one optical fiber protrudes beyond a surface of the optical interface by a protrusion P.

In another embodiment, an optical coupling system includes an optical receptacle assembly and an optical connector. The optical receptacle assembly includes a base substrate, a receptacle housing coupled to the base substrate, and a photonics circuit component coupled to the base substrate. The receptacle housing includes a receptacle surface, wherein the receptacle housing defines an opening between the receptacle housing and the base substrate. The photonics circuit component is disposed within the opening, and includes a substrate having an edge, and at least one waveguide disposed within the substrate and terminating at the edge. The optical connector includes a ferrule body having a surface, an optical interface disposed within the surface such that the optical interface is recessed with respect to the surface by an offset distance d, and at least one fiber bore through the ferrule body and terminating at the optical interface. The optical connector further includes at least one optical fiber disposed within the at least one fiber bore such that the at least one optical fiber protrudes beyond a surface of the optical interface by a protrusion distance P. When the optical connector is coupled to the optical receptacle assembly, an end of the at least one optical fiber contacts the edge of the substrate at the at least one waveguide.

In yet another embodiment, an optical connector includes a ferrule body and at least one optical fiber. The ferrule body includes a ferrule surface, an optical interface at the ferrule surface, at least one fiber bore through the ferrule body and terminating at the optical interface; and a compliant material disposed at least on the optical interface. The at least one optical fiber is disposed within the at least one fiber bore and through the compliant material such that the at least one optical fiber protrudes beyond a surface of the compliant material by a protrusion P.

In yet another embodiment, an optical coupling for a photonics circuit includes an optical receptacle assembly and an optical connector. The optical receptacle assembly includes a base substrate, a receptacle housing coupled to the base substrate, and a photonics circuit component coupled to the base substrate. The receptacle housing includes a receptacle surface and defines an opening between the receptacle housing and the base substrate. The photonics circuit component is disposed within the opening, and includes a substrate having an edge, and at least one waveguide disposed within the substrate and terminating at the edge. The optical connector includes a ferrule body and at least one optical fiber. The ferrule body includes a ferrule surface, an optical interface at the ferrule surface, at least one fiber bore through the ferrule body and terminating at the optical interface, and a compliant material disposed at least on the optical interface. The at least one optical fiber is disposed within the at least one fiber bore and through the compliant material such that the at least one optical fiber protrudes beyond a surface of the compliant material by a protrusion P. When the optical connector is coupled to the optical receptacle assembly an end of the at least one optical fiber contacts the edge of the substrate at the at least one waveguide.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 3 schematically depicts a close-up perspective view of an example optical receptacle assembly according to one or more embodiments described and illustrated herein;

FIG. 8A schematically depicts a perspective view of an example optical connector having a compliant material at an optical interface according to one or more embodiments described and illustrated herein;

DETAILED DESCRIPTION

Embodiments are directed to optical connectors and optical couplings for silicon photonics-based, high-bandwidth optical communication applications. More specifically, embodiments of the present disclosure provide for a fiber-to-chip optical couplings employing an optical connector that eliminates physical contact between an optical interface of a ferrule body and an edge of a photonics circuit component disposed within an optical receptacle assembly yet maintaining physical contact between fiber(s) and edge of the silicon chip. An area of the surface of the ferrule body surrounding optical fiber bores (i.e., the optical interface) is recessed from the remaining portion of the surface.

When the optical connector is mated to a corresponding optical receptacle assembly, an edge portion of a photonics circuit component may extend into an opening provided by the recessed area of the optical interface in some embodiments. In embodiments, the edge of the photonics circuit component does not contact a surface of the optical interface. One or more optical fibers disposed in one or more fiber bores extend beyond a surface of the optical interface. An end of the one or more optical fibers contacts one or more waveguides at an edge of the photonics circuit component. Because only the optical fibers of the optical connector contact the edge of the photonics circuit component, the surface area of physical contact between the optical connector and the photonics circuit component is minimized. This reduces the force inducing the distortion of both the ferrule body and the photonics circuit component and therefore reduces fiber-to-waveguide misalignment due to CTE mismatch.

Various embodiments of optical connectors and optical coupling systems are described in detail below.

Figure 1:
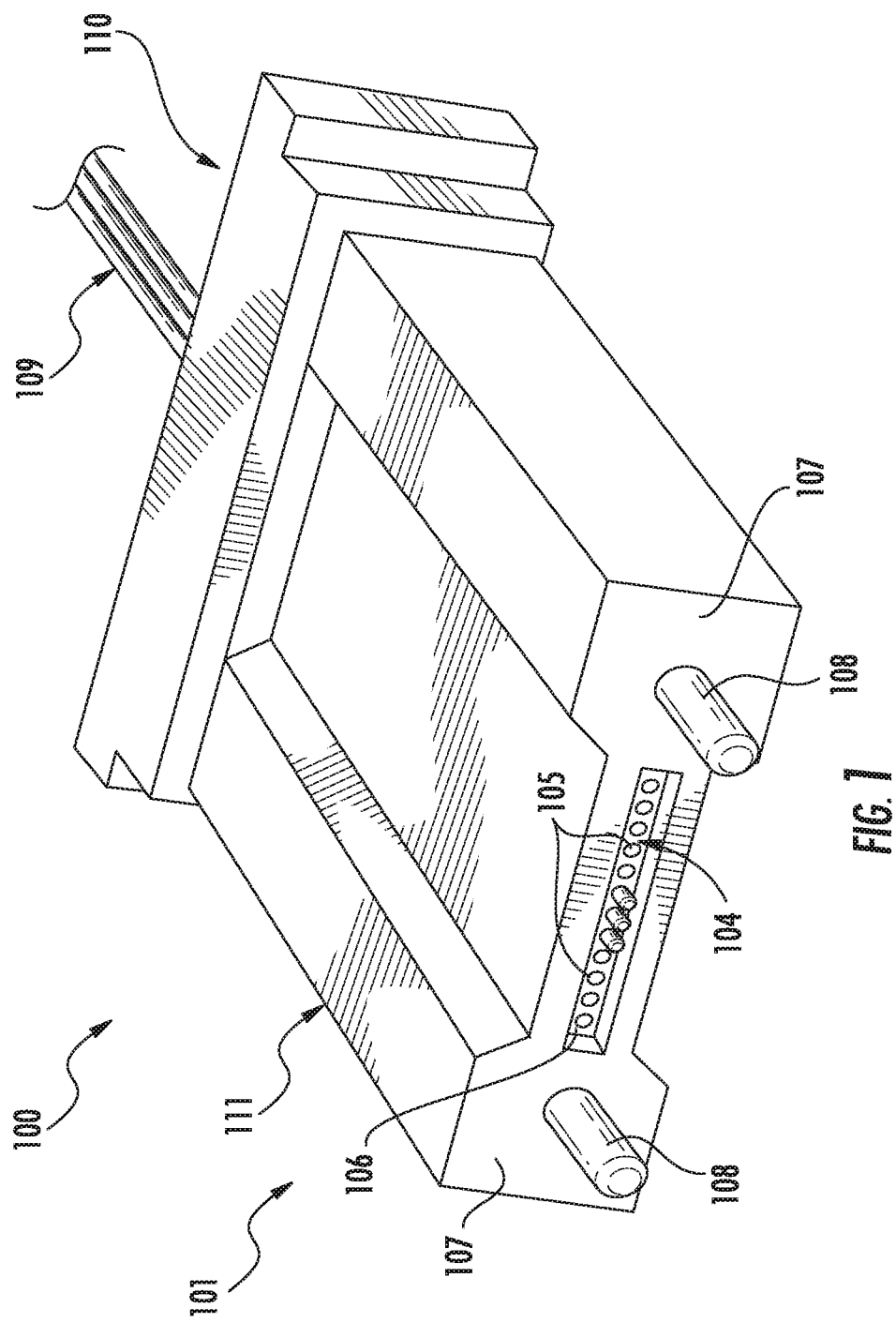
FIG. 1 schematically depicts a perspective view of an example optical connector according to one or more embodiments described and illustrated herein.

Referring now to FIG. 1, an example optical connector 100 is schematically illustrated. The optical connector 100 generally comprises a ferrule body 101 and at least one optical fiber 109. Although not depicted, the optical connector 100 may include other components, such as an external housing, for example.

As shown in FIG. 1, the example ferrule body 101 comprises a coupling end 111 and a flange portion 110. The ferrule body 101 further includes a ferrule surface 107 (i.e., a coupling surface) that is configured to face a corresponding surface of an optical receptacle assembly 130 (see FIGS. 3-5), as described in more detail below. Two optional alignment pins 108 may extend from the ferrule surface 107 to provide alignment of the optical fiber(s) 109 with respect to the waveguide(s) 165 within the optical receptacle assembly 130.

The ferrule body 101 includes an optical interface 104 disposed within the ferrule surface 107. In the illustrated embodiment, the optical interface 104 is provided between the alignment pins 108. One or more fiber bores 105 pass through the ferrule body 101 such that the one or more fiber bores 105 open at the optical interface 104. One or more optical fibers 109 are disposed and maintained within the one or more fiber bores 105. The one or more optical fibers 109 may be secured within the one or more fiber bores 105 by use of an adhesive, for example. As an example and not a limitation, the one or more optical fibers 109 may be configured as standard single mode fiber or small effective area fiber, for example, with mode field diameter of about 10 um or less.

In the illustrated embodiment, the ferrule body 101 is notched on a first surface and a second surface such that the height of the ferrule surface 107 proximate the optical interface 104 is less than a height of the ferrule surface 107 proximate the edges of the ferrule body 101 and near the area surrounding the alignment pins 108. It should be understood that the shape and configuration of the ferrule body may be different from the shape and configuration depicted throughout the figures and described herein. For example, the ferrule body may not possess a notched shape, may include more or fewer alignment pins, the optical interface may have more or fewer fiber bores than depicted (e.g., multiple rows of fiber bores), and the like.

Figure 2A:
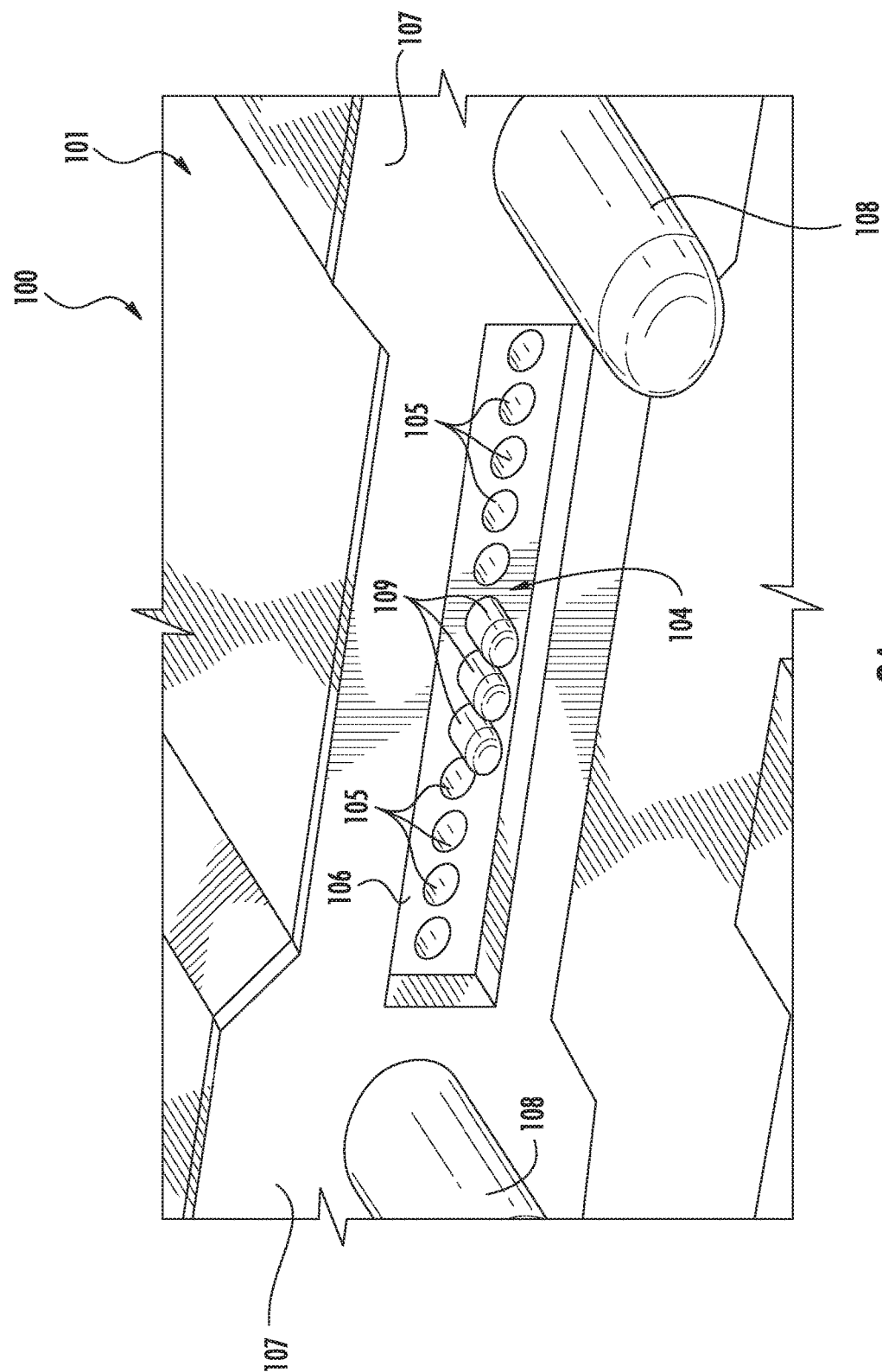
FIG. 2A schematically depicts a close-up perspective view of the example optical connector depicted in FIG. 1 according to one or more embodiments described and illustrated herein.
Figure 2B:
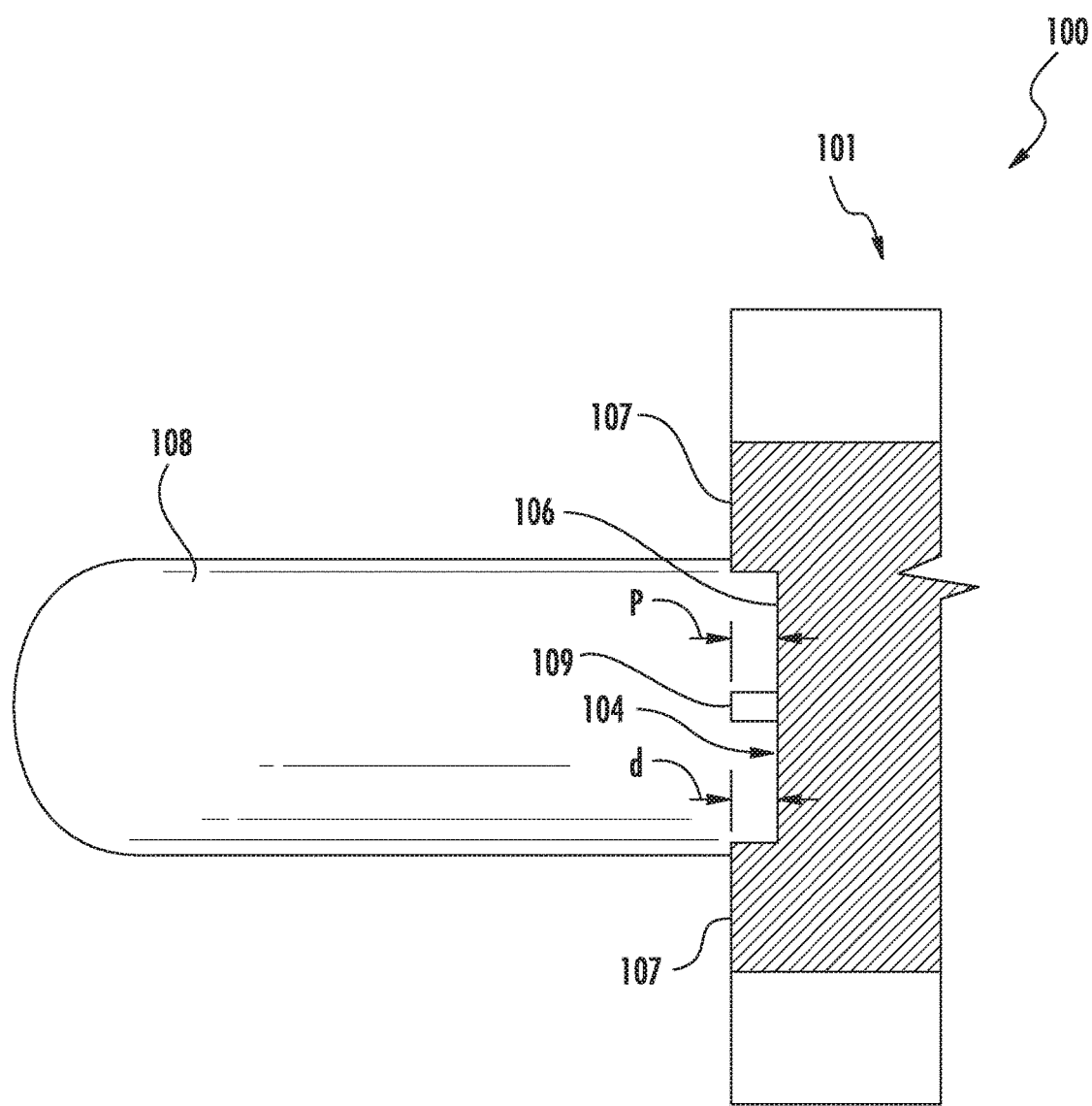
FIG. 2B schematically depicts a partial cross-sectional view of the example optical connector depicted in FIGS. 1 and 2A according to one or more embodiments described and illustrated herein.

FIG. 2A schematically illustrates a close-up view of the optical interface 104 of the ferrule body 101 depicted in FIG. 1. FIG. 2B is a cross-sectional view of the ferrule body 101 depicted in FIGS. 1 and 2A. Referring to FIGS. 1, 2A and 2B, the optical interface 104 is recessed with respect to the ferrule surface 107 such that a surface 106 of the optical interface 104 is offset with respect to the ferrule surface 107 by an offset distance d, as shown in FIG. 2B. Referring briefly to FIG. 3, the shape of the optical interface 104 and the size of the offset distance d should be such that an edge 163 of a photonics circuit component 160 may be positioned within a recessed area provided by the optical interface 104 when the optical connector 100 is mated to an optical receptacle assembly 130 such that the edge 163 of the photonics circuit component 160 does not contact the surface 106 of the optical interface. In other embodiments, the edge 163 of the photonics circuit component 160 is not positioned within the recessed area when the optical connector 100 is mated to an optical receptacle assembly 130.

As an example and not a limitation, the offset distance d, which is measured from the surface 106 of the optical interface 104 to the ferrule surface 107, may be greater than 5 μm, such as between about 5 μm and 1 mm. It should be understood that other dimensions may also be utilized.

As best shown in FIGS. 2A and 2B, each optical fiber 109 protrudes from the surface 106 of the optical interface 104 by a protrusion P. It should be understood that, although FIG. 2A depicts three optical fibers 109, more or fewer optical fibers 109 may be provided depending on the particular application. The protrusion P allows for end(s) of the optical fiber(s) 109 to contact the waveguide(s) 165 of the photonics circuit component 160 without the surface 106 of the optical interface 104 of the ferrule body 101 physically contacting the edge 163 of the photonics circuit component 160. As described in more detail below, the recessed optical interface 104 and the protruding optical fibers 109 minimizes the surface area of the components of the optical connector 100 that contacts the edge 163 of the photonics circuit component 160.

The length of the protrusion P should be such that the end(s) of the optical fiber(s) contact the edge of the photonics circuit component 160 when the optical connector 100 is mated to the optical receptacle assembly 130. As an example and not a limitation, the length of the protrusion P may be greater than 1 μm, such as within a range of about 1 μm to about 5 μm.

Figure 4:
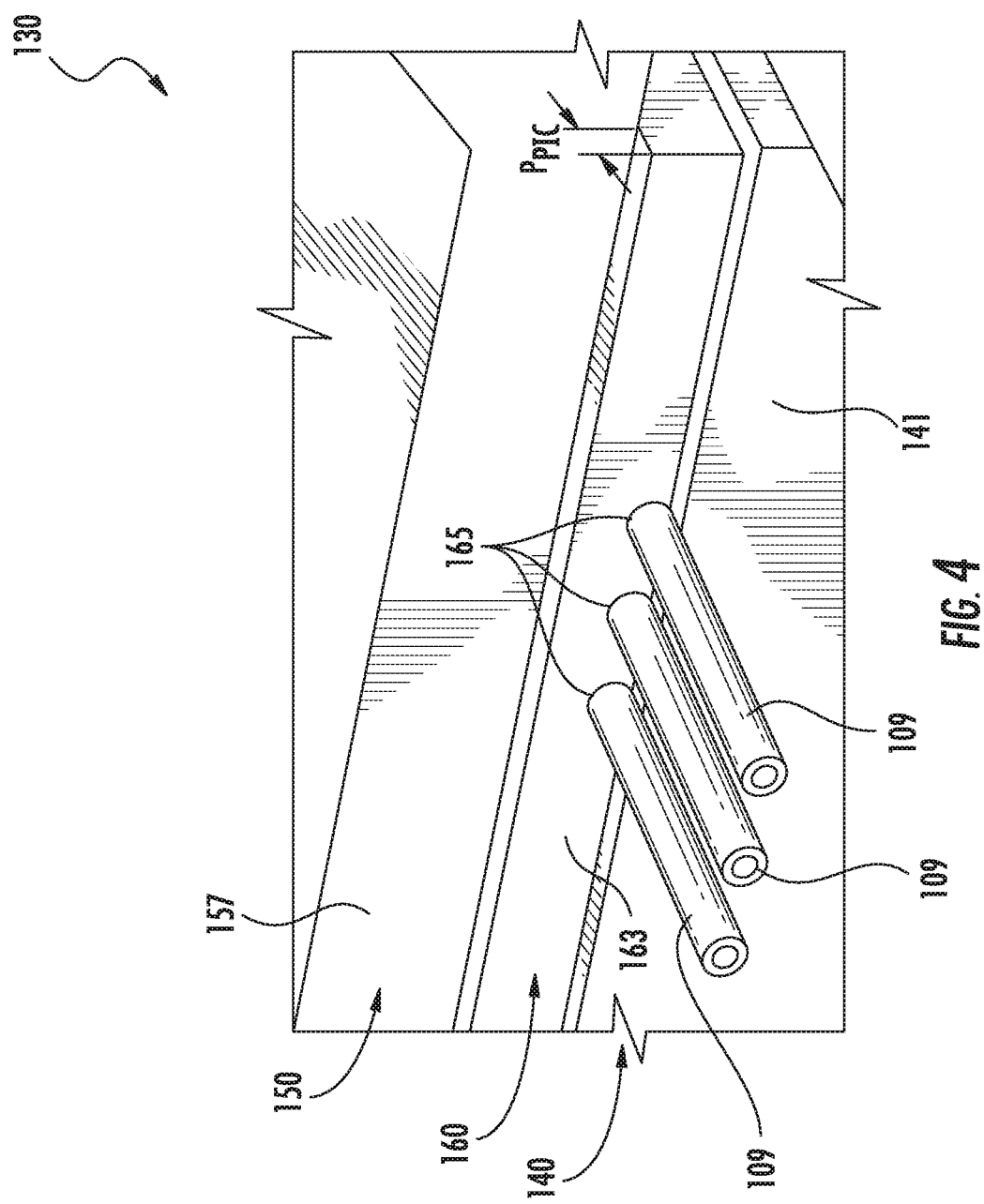
FIG. 4 schematically depicts a close-up perspective view of an edge of a photonics circuit component of the example optical receptacle assembly depicted in FIG. 3 according to one or more embodiments described and illustrated herein.
Figure 5:
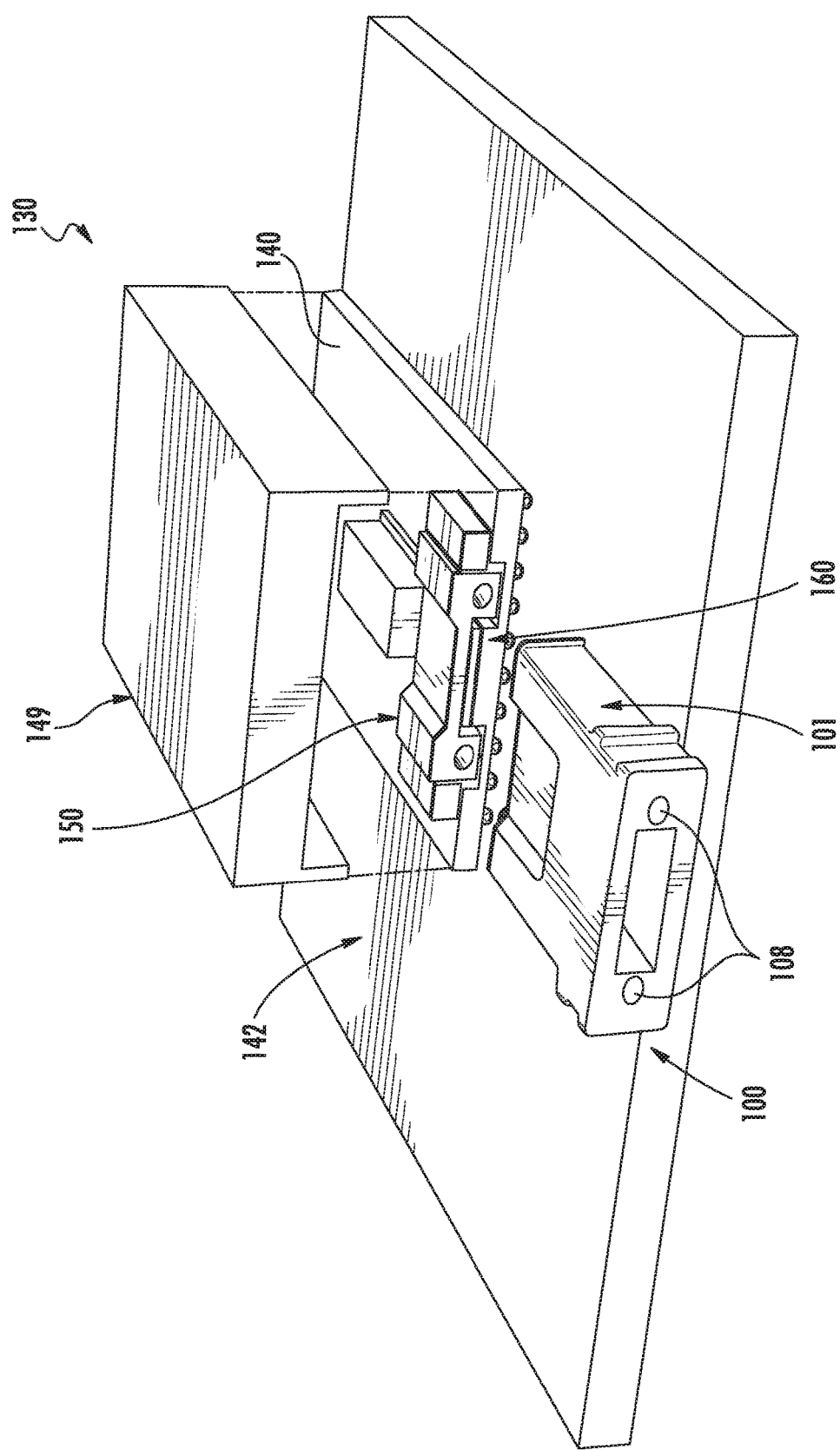
FIG. 5 schematically depicts a perspective view of the example optical connector of FIG. 1 without optical fibers and a partial exploded view of the example optical receptacle assembly of FIG. 3 in an unmated state according to one or more embodiments described and illustrated herein.
Figure 6:
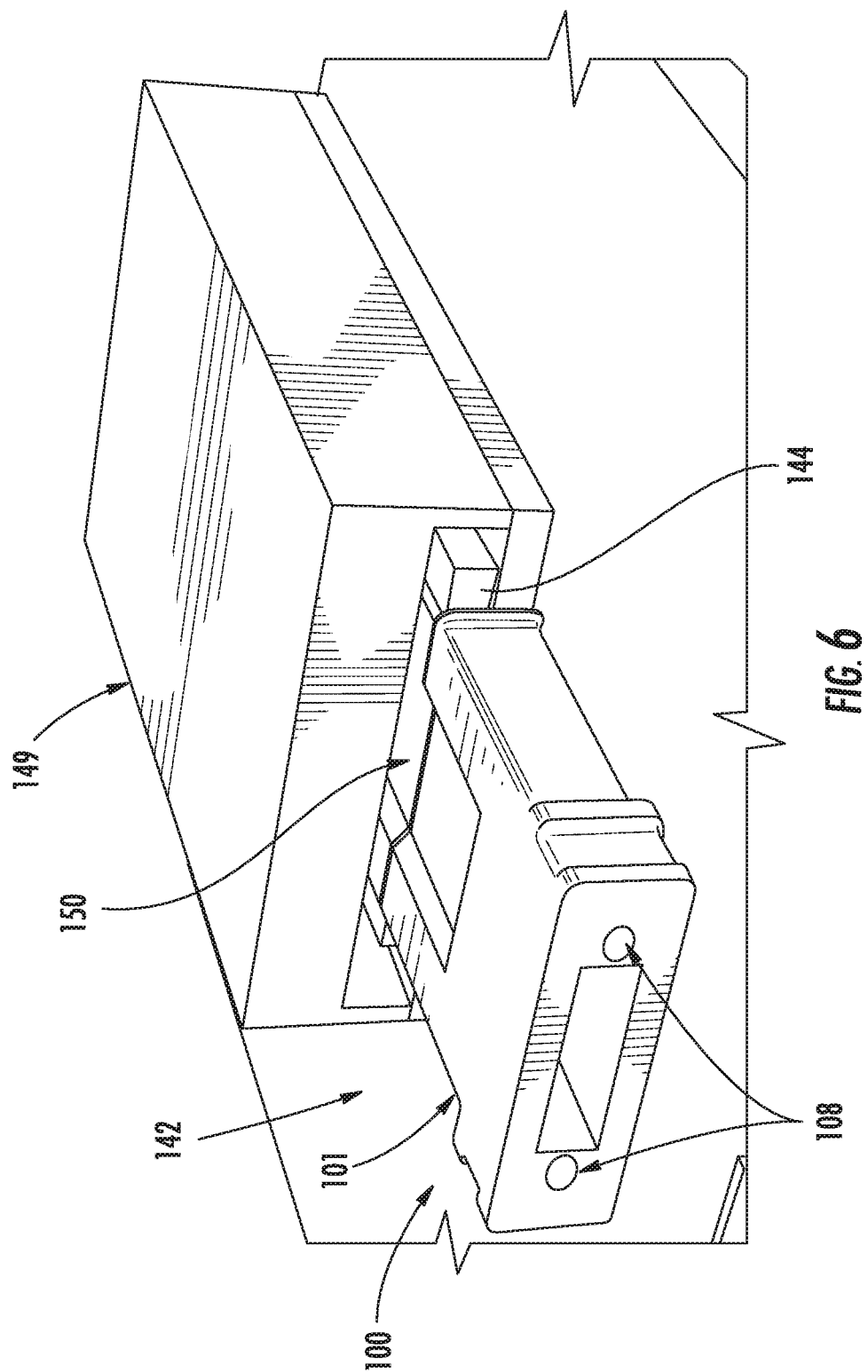
FIG. 6 schematically depicts a perspective view of the example optical connector and the example optical receptacle assembly depicted in FIG. 5 in a mated state according to one or more embodiments described and illustrated herein.

Referring now to FIGS. 3-6, an example optical receptacle assembly 130 for mating with the example optical connector depicted in FIGS. 1, 2A and 2B is schematically depicted. FIG. 3 is a close-up view of the example optical receptacle assembly 130, FIG. 4 is a close-up view of the edge 163 of the photonics circuit component 160, FIG. 5 depicts the example optical connector 100 and the example optical receptacle assembly 130 in an unmated state, and FIG. 6 depicts the example optical connector 100 and the example optical receptacle assembly 130 in a mated state. It is noted that FIG. 4 partially depicts three optical fibers 109 of the optical connector 100 depicted in FIG. 1 with the remaining components of the optical connector 100 not illustrated to show that the optical fibers 109 contact the waveguides 165 of the photonics circuit component 160.

The example optical receptacle assembly 130 generally comprises a base substrate 140, a photonics circuit component 160 coupled to the base substrate 140, and a receptacle housing coupled 150 to the base substrate 140 such that the receptacle housing 150 surrounds the photonics circuit component 160. The optical receptacle assembly 130 optionally includes a heat sink 148 thermally coupled to the photonics circuit component 160 and, in some cases, the cover 149. The optical receptacle assembly 130 may further optionally include support features 144 adjacent to the ferrule body 101 (e.g., glass block support features 144), and a cover 149 that surrounds various components of the optical receptacle assembly 130. In some embodiments, the base substrate 140 may be electrically coupled to a main substrate 142 (e.g., a printed circuit board) by any appropriate coupling means, such as by a ball grid array. It is noted that FIG. 5 shows the cover 149 removed from the optical receptacle assembly 130.

The example receptacle housing 150 is shaped and configured to mate with the example ferrule body 101 of the optical connector 100 illustrated in FIGS. 1, 2A and 2B. It should be understood that the receptacle housing may take on different shapes and configurations than that depicted in FIGS. 3-6 depending on the shape and configuration of the ferrule body.

The receptacle housing 150 may be coupled to the base substrate 140 by any appropriate means, such as by use of an adhesive, for example. The receptacle housing 150 is shaped to provide an opening 153 between it and the base substrate 140. As shown in FIG. 3, the photonics circuit component 160 is disposed on the base substrate 140 within the opening 153 such that it is positioned beneath the receptacle housing 150. Further, an upper surface of the example receptacle housing 150 is notched to correspond with the notched shape of the ferrule body 101 of the optical connector 100.

The receptacle housing 150 comprises a receptacle surface 157 that is configured to face the ferrule surface 107 of the ferrule body 101 when the optical connector 100 is mated to the optical receptacle assembly 130. In the example embodiment, two alignment bores 158 are disposed on opposite sides of the opening 153, and are configured to receive the alignment pins 108 of the optical connector 100. The cooperation between the alignment pins 108 and the alignment bores 158 provides alignment and physical contact between the optical fiber(s) 109 and the waveguide(s) 165 of the photonics circuit component 160.

As shown in FIGS. 3 and 4, the photonics circuit component 160 is coupled to the base substrate 140 beneath the receptacle housing 150. In the illustrated embodiment, the base substrate 140 comprises a pedestal 141 on which the photonics circuit component 160 is mounted. The pedestal 141 has a height to properly position the photonics circuit component 160 at the proper location with respect to the alignment bores 158 such that the waveguide(s) 165 of the photonics circuit component 160 are aligned with the optical fiber(s) 109 of the optical connector 100. The photonics circuit component 160 may be coupled to the pedestal 141 (or other element of the base substrate in alternative embodiments) by any appropriate means, such as by an adhesive or by solder.

Referring specifically to FIG. 4, an edge 163 of the photonics circuit component 160 may be offset from the receptacle surface 157 of the receptacle housing 150 by a protrusion $P_{PIC}$. The protrusion $P_{PIC}$ should be such that it allows for the edge 163 of the photonics circuit component 160 to be disposed within the recessed area of the ferrule body 101 at the optical interface 104 when the optical connector 100 is mated to the optical receptacle assembly 130. As an example and not a limitation, the protrusion $P_{PIC}$ may be greater than 0 µm, such as greater than 0 µm and less than 5 µm. In alternative embodiments, the edge 163 of the photonics circuit component 160 does not protrude past the receptacle surface 157 of the receptacle housing 150 (i.e., $P_{PIC}=0$).

The photonics circuit component 160 may be configured as any photonics chip assembly, such as a hybrid laser silicon chip or a Raman laser silicon chip, for example. The photonics circuit component 160 comprises a substrate 161 (e.g., a silicon substrate) in or on which the one or more waveguides 165 are disposed. The photonics circuit component 160 may include one or more optical transmitters (not shown) optically coupled to the one or more waveguides 165 that produce one or more optical signals that propagate within the one or more waveguides 165. Additionally or alternatively, the photonics circuit component 160 may include one or more optical receivers (not shown) optically coupled to the one or more waveguides 165 and operable to receive one or more optical signals propagating within the one or more waveguides 165. Additional electrical components (not shown) may convert the one or more optical signals into one or more electrical signals.

As best shown in FIGS. 3 and 4, the one or more waveguides 165 terminate at the edge 163 of the photonics circuit component 160. Accordingly, the edge 163 of the photonics circuit component 160 is a light emitting and or receiving surface. It is through the physical connection between the optical fiber(s) 109 of the optical connector 100 and the waveguide(s) 165 at the edge 163 of the photonics circuit component 160 that optical signals pass between the optical connector 100 and the optical receptacle assembly 130.

When the optical connector 100 is mated with the optical receptacle assembly 130, the ferrule surface 107 of the ferrule body 101 faces, but does not contact, the receptacle surface 157 of the receptacle housing 150. The photonics circuit component 160 also does not contact the ferrule body 101. The offset distance d of the optical interface 104 of the ferrule body 101 and the protrusion $P_{PIC}$ is such that the edge 163 of the photonics circuit component 160 does not contact the surface 106 of the optical interface 104 when the edge portion of the photonics circuit component 160 is disposed within the recessed area surrounding the optical interface 104.

Due to the protrusion P of one or more optical fibers with respect to the surface 106 of the optical interface 104, only the end(s) of the one or more optical fibers contact the edge 163 of the photonics circuit component 160. FIG. 4 depicts only the optical fibers 109 of the example optical connector depicted in FIGS. 1, 2A and 2B. As shown in FIG. 4, the ends of the optical fibers 109 physically contact the edge 163 of the photonics circuit component 160 at the corresponding waveguides 165, thereby providing fiber-to-edge coupling between the optical fibers 109 and the photonics circuit component 160. As only the optical fibers 109 contact the edge 163 of the photonics circuit component 160, the surface area of the optical connector 100 that physically contacts the edge 163 of the photonics circuit component 160 is greatly reduced compared to the case where the entire edge 163 of the photonics circuit component 160 contacts a ferrule surface 107 of the ferrule body 101.

According to the embodiments of the present disclosure, direct physical contact between the ferrule body 101 and the photonics circuit component 160 is entirely avoided. This minimizes the distortion of the edge 163 of the photonics circuit component 160 due to CTE of the silicon substrate 161 and the material of the ferrule body 101, which in turn minimizes the misalignment between the optical fibers 109 at the waveguides 165 positioned at the edge 163.

Figure 7:
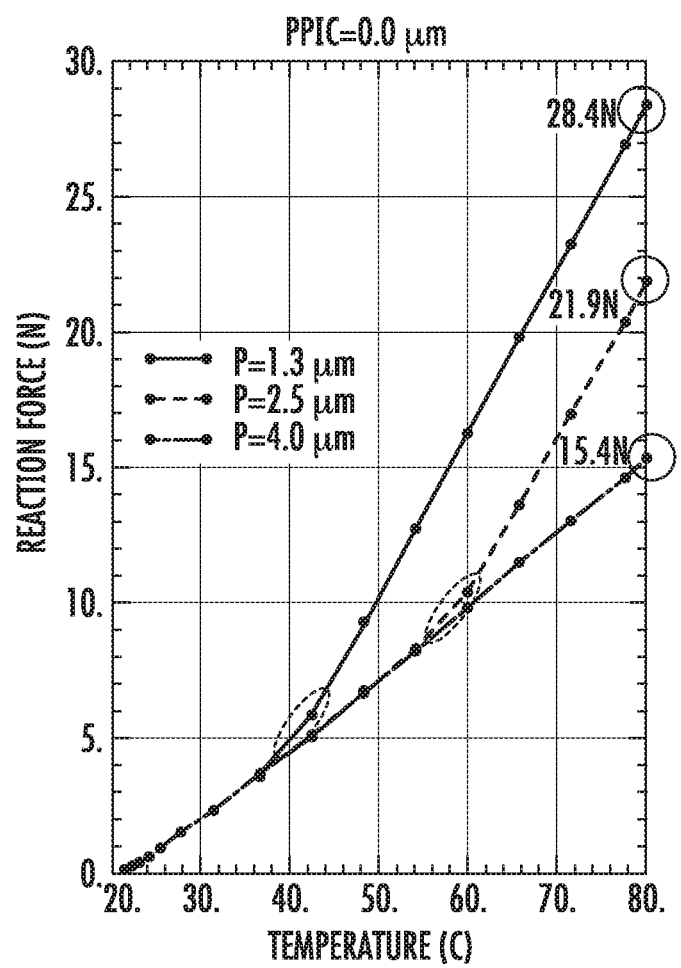
FIG. 7 graphically depicts a simulation plotting a reaction force between an optical connector and a photonics circuit component for a plurality of optical fiber protrusion dimensions and over a range of photonics circuit component operating temperatures.

The distortion caused by the contact of the ferrule body 101 also requires large contact forces to retain a physical connection between the optical fibers 109 and the waveguides 165. FIG. 7 graphically plots simulated reaction force required to maintain physical connection between the optical fibers and the waveguides for an optical connector without a recessed optical interface as described herein and having optical fibers protruding from the ferrule body by three different protrusions P amounts (1.3 µm, 2.5 µm, and 4.0 µm) over a range of photonics circuit component 160 operating temperatures. For the simulation, protrusion $P_{PIC}$ of the photonics circuit component is zero.

As shown in FIG. 7, the surface of the ferrule body contacts the photonics circuit component despite the protruding optical fibers due to distortion of the ferrule body and the photonics circuit component. For the case where the optical fiber protrudes from the ferrule body by 1.3 µm, the ferrule body contacts the photonics circuit component when the photonics circuit component operates at about 42° C., and requires about 28.2 N force to retain a physical connection between the optical fiber and the waveguide when the photonics circuit component operates at about 80° C. For the case where the optical fiber protrudes from the ferrule body by 2.5 µm, the ferrule body contacts the photonics circuit component when the photonics circuit component 160 operates greater than about 60° C., and requires about 21.9 N force to retain a physical connection between the optical fiber and the waveguide when the photonics circuit component operates greater than about 60° C. For the case where the optical fiber protrudes from the ferrule body by 4.0 µm, the ferrule body does not contact the photonics circuit component up to at about 80° C., and requires about 15.4 N force to retain a physical connection between the optical fiber and the waveguide when the photonics circuit component operates at about 80° C.

Although FIG. 7 shows that increasing the protrusion P of the optical fiber helps to avoid contact between the surface of the ferrule body and the edge of the photonics circuit component, too high of a protrusion P might be difficult to achieve through optical fiber polishing. Furthermore, keeping the protrusions of each optical fiber the same may be challenging for long optical fibers extending out of the ferrule body. Accordingly, the recessed optical interface 104 of the ferrule bodies 101 of the present disclosure add additional clearance between the ferrule body 101 and the edge 163 of the photonics circuit component 160, thereby reducing the amount of optical fiber protrusion P needed for a desirable effect on reducing distortion, minimizing misalignment, and reducing contact force requirements.

Although removing the contact between the ferrule surface 107 of the ferrule body 101 and the edge 163 of the photonics circuit component 160 reduces the overall contact force required to maintain physical connection between the optical fibers 109 and the photonics circuit component 160, almost all of the contact force will be spread over just the ends of the optical fibers 109. This may create high contact stresses between the glass optical fibers 109 and the silicon substrate 161 of the photonics circuit component 160. For example, a simulated total force acting on the optical fibers 109 is about 13 N (additional force (about 2 N) also comes from the interaction between the alignment pins and alignment bores). For three optical fibers 109, the total force in each optical fiber is about 4.5 N, and therefore an averaged fiber compressive stress of about 370 MPa (fiber proof tensile stress being about 700 MPa) should be expected. Such force on the optical fibers 109 may also contribute to misalignment between the optical fiber(s) 109 and the waveguide(s) 165, particularly in the vertical direction.

In other embodiments, a compliant material is provided around the optical fibers to redistribute the force more uniformly (at the expense of a small possible increase in the absolute value of the force) and to reduce or completely eliminate vertical misalignment (due to the friction force) caused by thermal effects and occurring during normal operation at 80° C.

Figure 8B:
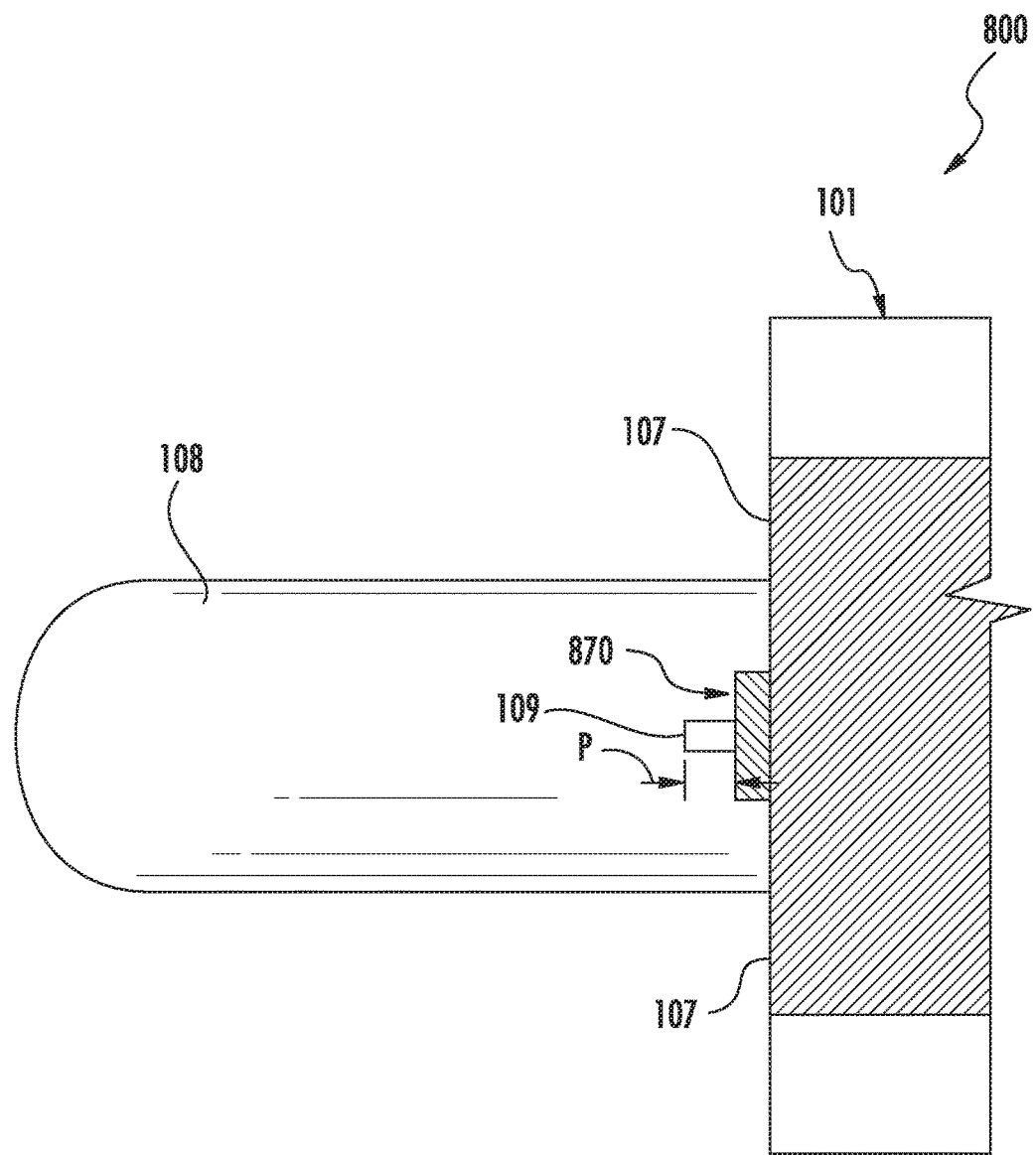
FIG. 8B schematically depicts a partial cross-sectional view of the example optical connector of FIG. 8A.

Referring now to FIGS. 8A and 8B, an alternative optical connector 800 having a compliant material 870 disposed around at least the optical interface 104 of the ferrule surface 107 of the ferrule body 101. The compliant material may be any suitable material, such as, without limitation, a thermoset elastomer (e.g., Nitrile rubbers, which typically have a Young's modulus in the order of 3 MPa). The compliant material 870 has a Young's modulus that is less than the Young's modulus of the material of the ferrule body. The compliant material 870 may be disposed only on and around the optical interface 104, over the entire ferrule surface 107, or over the entire ferrule body 101. The optical fiber 109 extends through the compliant material 870 (e.g., through holes in the compliant material 870) such that the protrusion P of the optical fiber(s) 109 is measured from the outer surface of the compliant material 870 to the end of the optical fiber(s) 109.

Figure 9A:
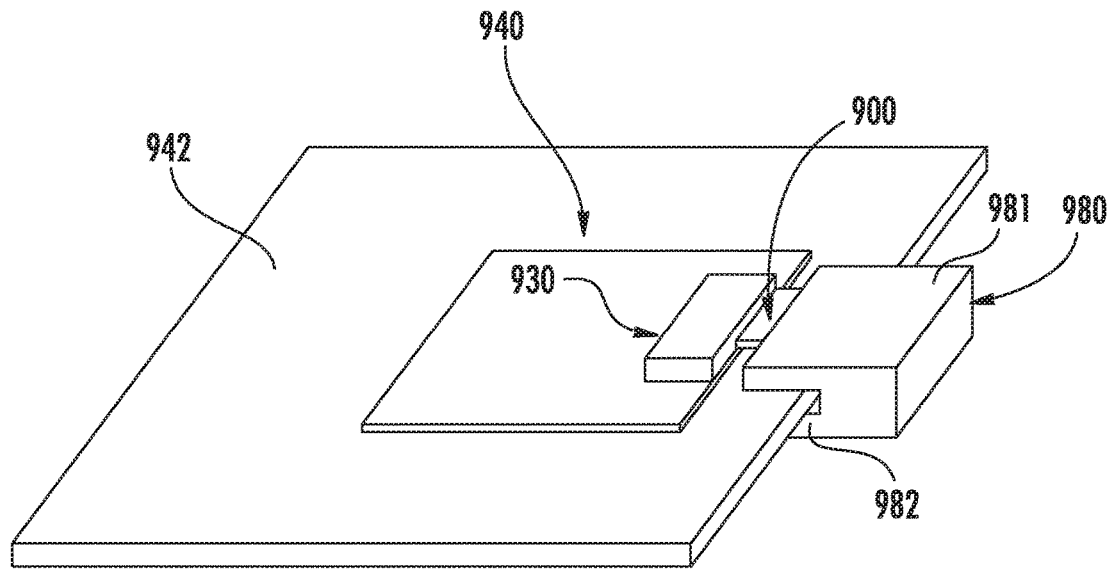
FIG. 9A schematically depicts a perspective view of an optical connector coupled to an optical receptacle assembly and a main substrate using a clamp according to one or more embodiments described and illustrated herein.
Figure 9B:
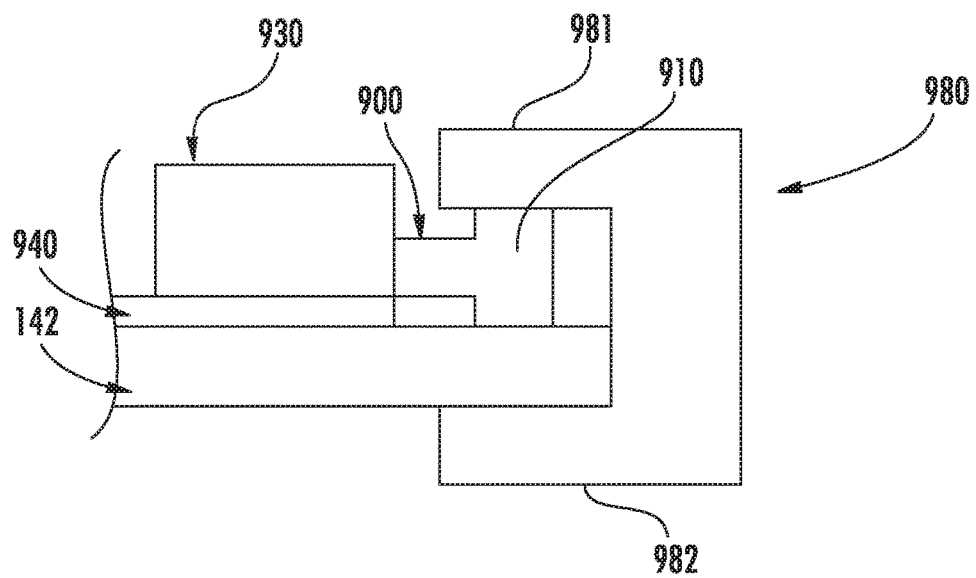
FIG. 9B schematically depicts a partial side view of the optical receptacle assembly, optical connector, and clamp depicted in FIG. 9A without fibers.

Referring now to FIGS. 9A and 9B, one or more mechanical elements may be provided to maintain the forces needed to maintain physical connection between the optical fiber(s) and the waveguide(s). FIG. 9A schematically depicts a perspective view, and FIG. 9B a side view, of a base substrate 940 coupled to a main substrate 942, an optical receptacle assembly 930 coupled to the base substrate 940, an optical connector 900 having a recessed optical interface (not shown) as described above coupled to the optical receptacle assembly 930, and a clamp 980 for clamping the optical connector 900 to the main substrate 942 and maintaining the requisite forces between the optical fibers and waveguides as described above.

The clamp 980 may be configured as any mechanical device that removably clamps the optical connector 900 to the main substrate 942. The example clamp 980 comprises a first portion 981 that contacts the optical connector 900 (e.g., at a flange portion 910) and a second portion 982 that contacts a surface of the main substrate 942 to clamp the optical connector 900 to the main substrate 942 when the optical connector 900 is coupled to the optical receptacle assembly 930.

It should now be understood that embodiments described herein are directed to optical connectors and optical coupling systems for fiber-to-edge coupling in photonics circuit optical communication applications. Embodiments reduce component distortion and fiber-to-waveguide misalignment by employing a ferrule geometry that has a surface with a recessed area around the optical fiber, and also disposing the optical fibers within the ferrule such that they protrude out of the ferrule. In some embodiments, a compliant material is provided around the optical fibers to evenly distribute forces. Also in some embodiments, a clamp is provided to maintain connection between the fibers of the optical connector and the waveguide of the photonics circuit component.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. An optical coupling for a photonics circuit, the optical coupling comprising:
    an optical receptacle assembly comprising:
        a base substrate;
        a receptacle housing coupled to the base substrate, the receptacle housing comprising a receptacle surface, wherein the receptacle housing defines an opening between the receptacle housing and the base substrate; and
        a photonics circuit component coupled to the base substrate and disposed within the opening, the photonics circuit component comprising:
            a substrate having an edge, wherein the substrate protrudes beyond the receptacle surface of the receptacle housing by a protrusion distance $P_{PIC}$; and
            at least one waveguide disposed within the substrate and terminating at the edge; and
    an optical connector comprising:
        a ferrule body comprising:
            a ferrule surface;
            an optical interface disposed within the ferrule surface such that the optical interface is recessed with respect to the ferrule surface by an offset distance d; and
            at least one fiber bore through the ferrule body and terminating at the optical interface; and at least one optical fiber disposed within the at least one fiber bore such that the at least one optical fiber protrudes beyond a surface of the optical interface by a protrusion distance P, wherein when the optical connector is coupled to the optical receptacle assembly the edge of the substrate of the photonics circuit component is disposed within a recessed area surrounding the optical interface of the ferrule body and an end of the at least one optical fiber contacts the edge of the substrate at the at least one waveguide.

2. The optical coupling of claim 1 wherein the protrusion distance $P_{PIC}$ is greater than 0 μm and less than about 5 μm.

3. The optical coupling of claim 1, wherein the protrusion distance P is about 4 μm.

4. The optical coupling of claim 1, wherein the protrusion distance P is within a range of about 1 μm to about 5μm.

5. The optical coupling of claim 1, wherein the offset distance d is at least 5 μm.

6. The optical coupling of claim 1, wherein the offset distance d is within a range of about 5 μm to about 1 mm.

7. The optical coupling of claim 1, wherein the ferrule surface and a surface of the optical interface do not contact the photonic integrated circuit component.

8. The optical coupling of claim 1, wherein:
the photonics circuit component further comprises at least one of an optical transmitter and an optical receiver; and
the at least one waveguide is optically coupled to at least one of the optical transmitter and the optical receiver.

9. The optical coupling of claim 1, wherein the substrate is silicon.

10. The optical coupling of claim 1, wherein the optical receptacle assembly further comprises a first support feature adjacent a first side of the receptacle housing and a second support feature adjacent a second side of the receptacle housing.

11. The optical coupling of claim 10, wherein the first support feature and the second support feature are fabricated from glass.

12. The optical coupling of claim 1, wherein the optical receptacle assembly further comprises a cover disposed over at least the receptacle housing.

13. The optical coupling of claim 1, wherein the optical receptacle assembly further comprises at least one heat sink thermally coupled to the photonic integrated circuit component.

14. The optical coupling of claim 1, further comprising:
a main substrate, wherein the optical receptacle assembly is coupled to the main substrate; and
a clamp comprising a first portion and a second portion, wherein the first portion contacts the optical connector and the second portion contacts a surface of the main substrate to clamp the optical connector to the main substrate when the optical connector is coupled to the optical receptacle assembly.

15. The optical coupling of claim 1, wherein:
the optical connector further comprises a first alignment pin and a second alignment pin; and
the first alignment pin and the second alignment pin extend from the ferrule surface.

16. The optical coupling of claim 15, wherein the optical interface is positioned between the first alignment pin and the second alignment pin.

17. The optical coupling of claim 15, wherein:
the receptacle housing comprises a first alignment bore and a second alignment bore at the receptacle surface; and
the first alignment pin of the optical connector is disposed in the first alignment bore and the second alignment pin is disposed in the second alignment bore when the optical connector is coupled to the optical receptacle assembly.

18. The optical coupling of claim 1, wherein the at least one fiber bore comprises a plurality of bores, and the at least one optical fiber comprises a plurality of fibers.

19. The optical coupling of claim 18, wherein the plurality of bores is arranged in at least one row of bores.

20. The optical coupling of claim 1, wherein a force between the at least one optical fiber and the at least one waveguide is less than 15 N when the photonics circuit component is operated at a temperature of 80° C.

21. An optical coupling for a photonics circuit, the optical coupling comprising:
an optical receptacle assembly comprising:
a base substrate;
a receptacle housing coupled to the base substrate, the receptacle housing comprising a receptacle surface, wherein the receptacle housing defines an opening between the receptacle housing and the base substrate; and
a photonics circuit component coupled to the base substrate and disposed within the opening, the photonics circuit component comprising:
a substrate having an edge, wherein the substrate protrudes beyond the receptacle surface of the receptacle housing by a protrusion distance $P_{PIC}$; and
at least one waveguide disposed within the substrate and terminating at the edge.

22. The optical coupling of claim 21, wherein the optical receptacle assembly further comprises a cover disposed over at least the receptacle housing.

23. The optical coupling of claim 21, wherein the protrusion distance $P_{PIC}$ is greater than 0μm and less than 5 μm.

24. The optical coupling of claim 21, wherein the optical receptacle assembly further comprises a first support feature adjacent a first side of the receptacle housing and a second support feature adjacent a second side of the receptacle housing.

25. The optical coupling of claim 24, wherein the first support feature and the second support feature are fabricated from glass.

\* \* \* \* \*